(12) United States Patent
Kim

(10) Patent No.: US 7,501,163 B2
(45) Date of Patent: Mar. 10, 2009

(54) LIQUID CRYSTAL DISPLAY DEVICE AND METHOD FOR MANUFACTURING THE SAME

(75) Inventor: Soopool Kim, Seongnam-si (KR)

(73) Assignee: LG Display Co., Ltd., Seoul (KR)

( * ) Notice: Subject to any disclaimer, the term of this patent is extended or adjusted under 35 U.S.C. 154(b) by 308 days.

(21) Appl. No.: 11/473,116

(22) Filed: Jun. 23, 2006

(65) Prior Publication Data

US 2007/0122566 A1    May 31, 2007

(30) Foreign Application Priority Data

Nov. 28, 2005   (KR) .................. 10-2005-0114268

(51) Int. Cl.
*C09K 19/00* (2006.01)
*C09K 19/52* (2006.01)

(52) U.S. Cl. .................. 428/1.1; 428/1.2; 430/20; 430/270.1; 252/299.01; 349/158

(58) Field of Classification Search .................. 428/1.1, 428/1.2; 430/20, 270.1; 252/299.01; 349/158
See application file for complete search history.

(56) References Cited

U.S. PATENT DOCUMENTS

2006/0001789 A1 *   1/2006   Ahn .......................... 349/42

* cited by examiner

*Primary Examiner*—Geraldina Visconti
(74) *Attorney, Agent, or Firm*—McKenna Long & Aldridge LLP

(57) ABSTRACT

A liquid crystal display device having a polymer adhesive layer interposed between a substrate and a pattern or between one pattern and another pattern, and a method for manufacturing the same are disclosed. The polymer adhesive layer is interposed where peeling problems occur. The polymer adhesive layer reduces process errors and improves reliability. The device includes: a first substrate; gate lines, data lines, TFTs, and pixel electrodes on a surface of the first substrate; a second substrate bonded to the first substrate; a liquid crystal layer between the first and second substrates; a black matrix layer and a color filter layer on a surface of the second substrate; a sealant formed along an edge of a substrate that bonds the first and second substrates to each other; spacers that maintain a cell gap between the first and second substrates; and a polymer adhesive layer that improves adhesive characteristics.

26 Claims, 7 Drawing Sheets

LIQUID CRYSTAL DISPLAY DEVICE AND METHOD FOR MANUFACTURING THE SAME

This application claims the benefit of Korean Patent Application 10-2005-0114268, filed on Nov. 28, 2005, which is hereby incorporated by reference for all purposes as if fully set forth herein.

BACKGROUND OF THE INVENTION

1. Field of the Invention

The present invention relates to a liquid crystal display device and a method for manufacturing the same. More particularly, the present invention relates to a liquid crystal display device having a nano-polymer adhesive layer that prevents a peeling problem from occurring between a substrate and a pattern and/or between one pattern and another pattern, and a method for manufacturing the same.

2. Discussion of the Related Art

New high-tech visual display devices, such as high definition TVs are currently being developed. Accordingly, flat panel display devices have been developed to replace cathode ray tubes (CRT). The flat panel display devices include liquid crystal display (LCD) devices, electro luminescence display (ELD) devices, vacuum fluorescence display (VFD) devices, and plasma display panel (PDP) devices.

LCD devices are advantageous in that they have a thin profile, low production costs, and low power consumption. Thus, they are increasingly used in vehicles, color TVs, laptop computers and pocket computers.

LCD devices include a thin film transistor (TFT) array substrate as a first substrate, a color filter layer array substrate as a second substrate, and liquid crystal having anisotropy in a dielectric constant formed between the first and second substrates. LCD devices are operated by switching TFTs on and off using a process where sub-pixels select address lines and a voltage is applied to corresponding sub-pixels.

LCD devices are manufactured using a transistor array substrate forming process, a color filter array substrate forming process, a spacer forming process, a sealant forming process, a substrate bonding process and a liquid crystal injecting process.

Referring to FIG. 1, a method for manufacturing a related art liquid crystal display device is shown. FIG. 1 is a flow chart illustrating the method for manufacturing a related art liquid crystal display device.

In the transistor array substrate forming process (S1), deposition, photolithography, and etching are repeatedly performed on a first substrate to form transistors and pixel electrodes in sub-pixels defined by gate lines and data lines.

In the color filter array substrate forming process (S2), a black matrix layer is formed on a second substrate, red (R), green (G), and blue (B) color filter layers arranged in a designated order are formed on the black matrix layer, and a common electrode is formed on the overall surface of the second substrate including the color filter layers. To compensate for a difference in heights of the color filter layers and to prevent materials of the color filter layers from being diffused into a liquid crystal layer, an overcoat layer may be formed on the overall surface of the second substrate including the color filter layers.

After the transistor array substrate forming process (S1) and the color filter array substrate forming process (S2) are completed, an orientation film that determines an initial orientation of liquid crystal may be formed on the overall surface of the first or second substrate provided with various patterns.

After the transistor array substrate forming process (S1) and the color filter array substrate forming process (S2) are completed, the spacer forming process (S3) is performed. In the spacer forming process (S3), ball spacers, such as plastic balls or silica balls having a size of about 4-5 μm, are formed on the overall surface of the second substrate for maintaining a cell gap between the substrates.

Thereafter, the sealant forming process (S4) is performed. In this process, a sealant, which may contain micro pearl, is formed along the edge of the first substrate except for a liquid crystal inlet by a printing method for forming the cell gap. The sealant prevents leakage of liquid crystal.

Thereafter, a substrate bonding process (S5) is performed. In this process, the second substrate having the ball spacers formed thereon and the first substrate having the sealant formed thereon are aligned using alignment marks and bonded to be firmly attached to each other by hardening the sealant at a high-temperature and a high-pressure.

Although not shown, in order to cut the two substrates, which are completely attached to each other, into portions having a predetermined size, a scribe process, in which lines are formed on the surface of the substrates, and a break process, in which impact is applied to the lines to divide the bonded substrates into liquid crystal cell units, is performed.

Finally, the liquid crystal injecting process (S5) is performed. In this process, a liquid crystal layer is formed by injecting liquid crystal into a space between the first substrate and the second substrate using the liquid crystal inlet. The liquid crystal inlet is then sealed. Thereby, the related art liquid crystal display device is completed.

However, the above related art liquid crystal display device and the method for manufacturing the same have several problems.

First, a metal material, which is used to form the gate lines, has poor adhesion to the substrate and thus peels off from the substrate.

Second, when the cell gap between the bonded substrates increases due to various reasons, the spacers for maintaining the cell gap between the bonded substrates are not fixed in the liquid crystal layer and are movable in the liquid crystal layer. Thus, the spacers may not be uniformly distributed, and when the liquid crystal display device is moved, the spacers gather due to gravity.

Third, when the overcoat layer is formed on the overall surface of the substrate including the color filter layers, the overcoat layer may peel off from the edge of the substrate having the sealant formed thereon. To solve the above problems in the related art, a patterning process for removing the overcoat layer from the edge of the substrate is additionally performed. However, in this related art patterning process, a photo-etching process and an expensive exposure apparatus are additionally required. Thus, process time and costs are increased.

SUMMARY OF THE INVENTION

Accordingly, the present invention is directed to a liquid crystal display device and a method for manufacturing the same.

An advantage of the present invention is to provide a liquid crystal display (LCD) device having a polymer adhesive layer interposed between a substrate and a pattern and/or between one pattern and another pattern, and a method for manufacturing the same. The polymer adhesive layer reduces the generation of process errors and improves reliability of the device.

Another advantage of the present invention is to provide a liquid crystal display (LCD) device having a polymer adhesive layer formed by an easy method, such as a spin coating method or an ink-jet printing method, and a method for manufacturing the same.

Another advantage of the present invention is to provide a liquid crystal display (LCD) device having a polymer adhesive layer that is formed by a method that does not require a photo-etching process, and a method for manufacturing the same. Thus, process time and costs are not increased.

Additional features and advantages of the invention will be set forth in the description which follows, and in part will be apparent from the description, or may be learned by practice of the invention. These and other advantages of the invention will be realized and attained by the structure and method particularly pointed out in the written description and claims hereof as well as the appended drawings.

To achieve these and other advantages and in accordance with the purpose of the present invention, as embodied and broadly described, a liquid crystal display device includes: a first substrate including first patterns; gate lines, data lines, TFTs, and pixel electrodes on an inner surface of the first substrate; a second substrate bonded to the first substrate and including second patterns; a liquid crystal layer between the first and second substrates; a black matrix layer and a color filter layer on an inner surface of the second substrate; a sealant along an edge of at least one of the first and second substrates that bonds the first and second substrates to each other; spacers that maintain a cell gap between the first and second substrates; and a polymer adhesive layer between the first patterns, between the second patterns, between the first patterns and the first substrate, or between the second patterns and the second substrate, wherein the polymer adhesive layer improves adhesive characteristics.

In another aspect of the present invention, a method for manufacturing a liquid crystal display device includes: preparing a first substrate including first patterns; preparing a second substrate including second patterns; forming gate lines and data lines to cross each other to define sub-pixels; forming TFTs and pixel electrodes in corresponding sub-pixels on the first substrate; forming a black matrix layer and a color filter layer on the second substrate; forming a sealant along an edge of at least one of the first and second substrates; forming spacers on an overall surface of at least one of the first and second substrates; bonding the first and second substrates to each other; forming a liquid crystal layer between the first and second substrates; and interposing a polymer adhesive layer between the first patterns, between the second patterns, between the first patterns and the first substrate, or between the second patterns and the second substrate, wherein the polymer adhesive layer improves adhesive characteristics.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Reference will now be made in detail to exemplary embodiments of the present invention, examples of which are illustrated in the accompanying drawings. Wherever possible, the same reference numbers will be used throughout the drawings to refer to the same or similar parts.

First Embodiment

Figure 1:
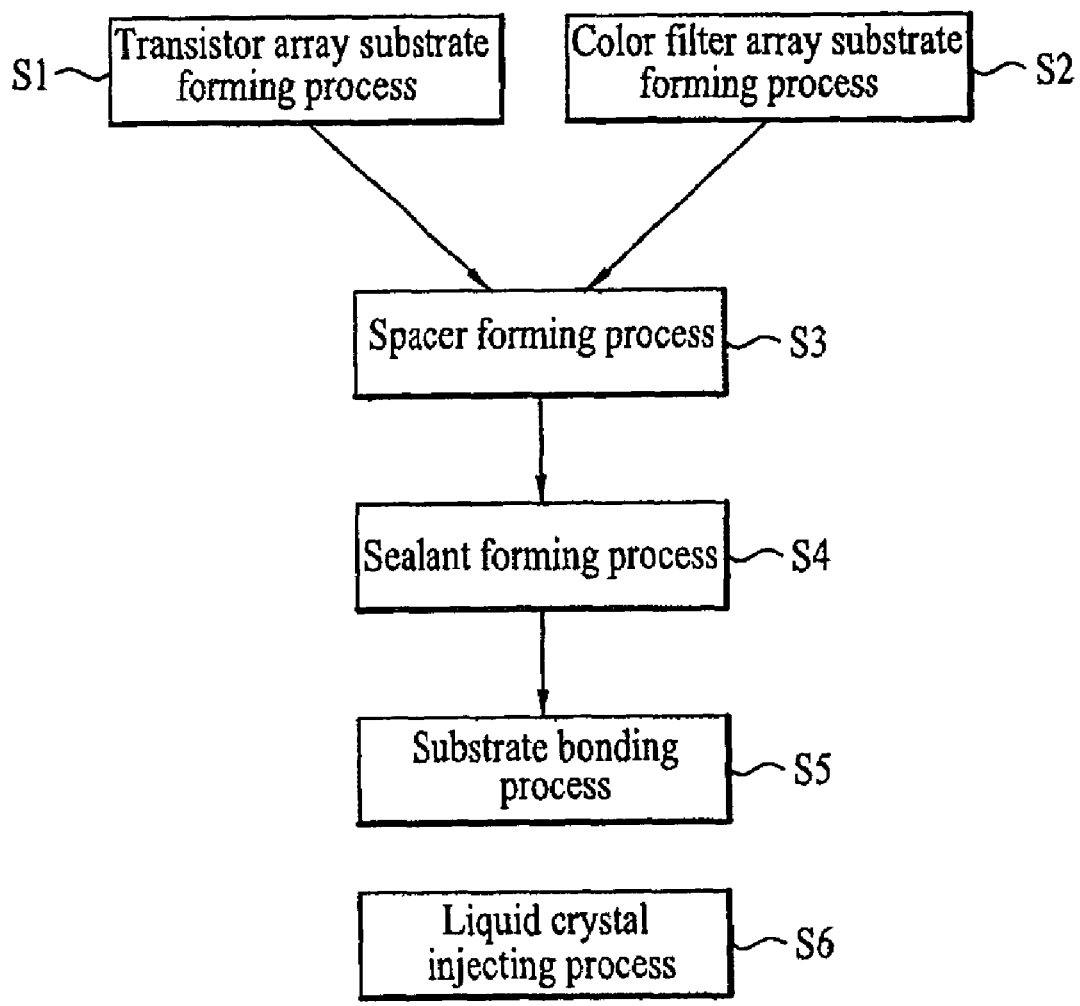
FIG. 1 is a flow chart illustrating a method for manufacturing a related art liquid crystal display device.
Figure 2:
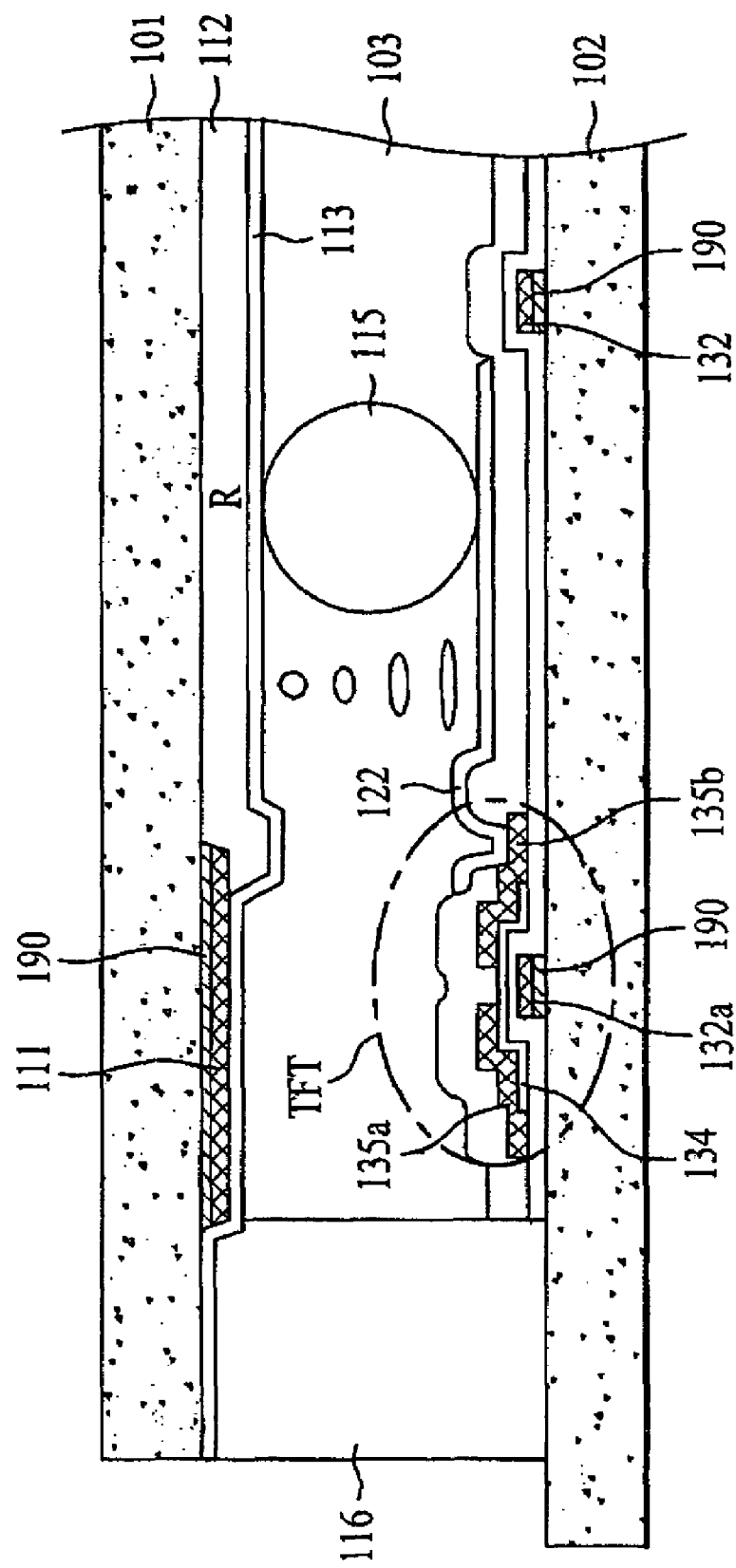
FIG. 2 is a sectional view of a liquid crystal display device in accordance with a first embodiment of the present invention.

FIG. 2 is a sectional view of a liquid crystal display device in accordance with a first embodiment of the present invention, and FIGS. 3A to 3D are sectional views illustrating a method for manufacturing the liquid crystal display device in accordance with the first embodiment of the present invention.

As shown in FIG. 2, the liquid crystal display device of the first embodiment includes first and second substrates 102 and 101 opposing each other, a sealant 116 that bonds the first and second substrates 102 and 101 to each other deposited along the edge of the first substrate 102 except for a liquid crystal inlet, spacers 115 that maintain a cell gap between the first and second substrates 102 and 101 and a cell gap at the liquid crystal inlet, and a liquid crystal layer 103 filling a space between the first and second substrates 102 and 101.

Data lines (not shown) and gate lines 132 that cross each other to define sub-pixels and TFTs formed at the crossings between the data lines and the gate lines 132 that are switched ON/OFF based on the sub-pixels are formed on the inner surface of the first substrate 102. Furthermore, pixel electrodes 122 opposing a common electrode 113 that apply voltages for driving liquid crystal and a polymer adhesive layer 190 interposed between the first substrate 102 and the gate lines 132 that improves adhesive characteristics between the first substrate 102 and the gate lines 132 are formed on the inner surface of the first substrate 102. Each of the TFTs includes a gate electrode 132a branched off from the gate line 132, a semiconductor layer 134 formed on the gate electrode 132a and insulated from the gate electrode 132a, and source/drain electrodes 135a and 135b branched off from the data line. The polymer adhesive layer 190 is formed under the gate electrode 132a.

A black matrix layer 111 that prevents light from leaking and red (R), green (G), and blue (B) colors from mixing, an R, G, and B color filter layer 112, a common electrode 113 that applies voltage to liquid crystal with the pixel electrodes 122, and a polymer adhesive layer 190 that improves adhesive characteristics between the second substrate 101 and the black matrix layer 111 are formed on the inner surface of the second substrate 101.

The polymer adhesive layer 190 is formed between the first substrate 102 and the gate lines 132 and between the first substrate 102 and the gate electrodes 132a of the TFTs to prevent the gate lines 132 and the gate electrodes 132a of the TFTs from peeling off from the first substrate 102.

Further, the polymer adhesive layer 190 is formed between the second substrate 101 and the black matrix layer 111 to prevent the black matrix layer 111 from peeling off from the second substrate 101.

The polymer adhesive layer 190 may be made of a compound containing styrene, methyl methacrylate (MMA), and benzocyclobutene (BCB) in designated quantities, and may have an ultra-thin thickness of less than 5 nm.

A process for patterning the polymer adhesive layer 190 formed under the gate lines 132 and the gate electrodes 132a of the TFTs will be described.

Figure 3A:
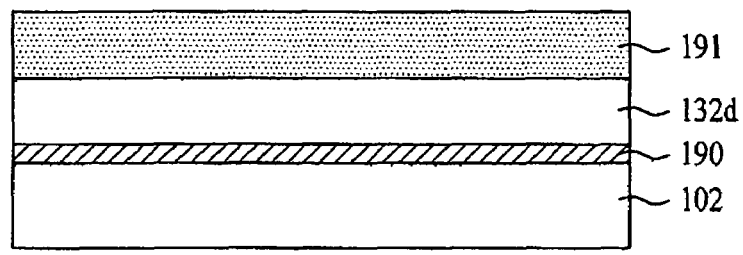
FIGS. 3A, 3B, 3C and 3D are sectional views illustrating a method for manufacturing the liquid crystal display device in accordance with the first embodiment of the present invention.

First, as shown in FIG. 3A, the polymer adhesive layer 190 may be formed on the first substrate 102 using a spin-coating method or a roll-coating method. Then, a metal layer 132d, which may have a thickness of 2,000 Å is deposited on the polymer adhesive layer 190 by sputtering. The metal layer 132d may be made of at least one selected from the group consisting of copper (Cu), aluminum (Al), aluminum neodymium (AlNd), molybdenum (Mo), chromium (Cr), titanium (Ti), tantalum (Ta), and molybdenum-tungsten (MoW).

Figure 3B:
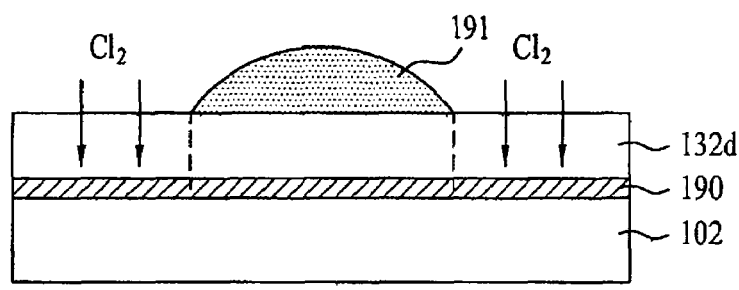

A photoresist 191 made of an ultraviolet (UV) curable resin is applied to the metal layer 132d and is exposed to UV rays or X-rays using an exposure mask (not shown) having a designated pattern coated thereon. The photoresist 191 is then developed and thereby patterned as shown in FIG. 3B.

Figure 3C:
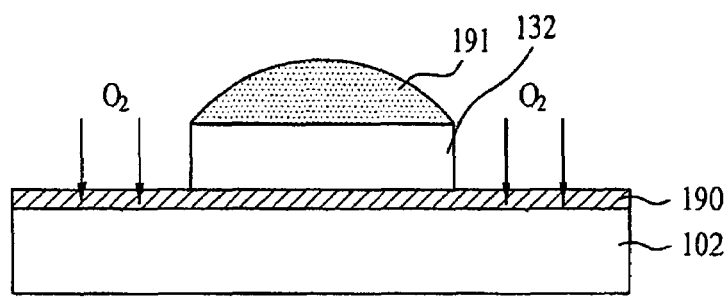

Thereafter, as shown in FIG. 3C, portions of the metal layer 132d exposed through the patterned photoresist 191 are etched, thus forming the gate lines 132 and gate electrodes 132a (in FIG. 2) of the TFTs.

Then, portions of the polymer adhesive layer 190 exposed through the patterned photoresist 191 are etched. Thereby, the polymer adhesive layer 190 under the gate lines 132 and the gate electrodes 132a is patterned in the same shape as the gate lines 132 and the gate electrodes 132a.

When the metal layer 132d and the polymer adhesive layer 190 are etched, the metal layer 132d may be wet-etched and the polymer adhesive layer 190 may be dry-etched. Further, both the metal layer 132d and the polymer adhesive layer 190 may be dry-etched. Moreover, the metal layer 132d and the polymer adhesive layer 190 may be simultaneously dry-etched in a single chamber. When the metal layer 132d and the polymer adhesive layer 190 are simultaneously dry-etched in one dry-etching chamber, different etching gases are used. Different etching gases are used because materials of the metal layer 132d and the polymer adhesive layer 190 are different. As shown in FIGS. 3B and 3C, the metal layer 132d is etched using $SF_6$, $Cl_2$, or $O_2$ as the etching gas, and the polymer adhesive layer 190 is etched using $O_2$ as the etching gas.

Figure 3D:
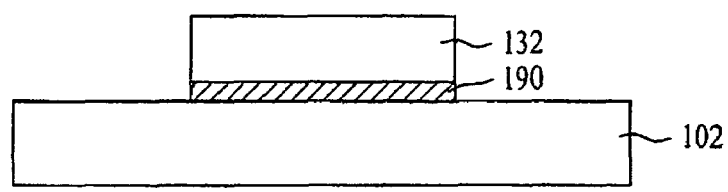

Finally, as shown in FIG. 3D, the remaining photoresist 191 is removed. Thereby, the polymer adhesive layer 190 is interposed between the first substrate 102 and the gate lines 132 and between the first substrate 102 and the gate electrodes 132a, thereby improving adhesive characteristics therebetween.

Further, a process that patterns the polymer adhesive layer formed under the black matrix layer is the same or similar to the above process for patterning the polymer adhesive layer 190 formed under the gate lines 132 and the gate electrodes 132a of the TFTs. A material for the black matrix layer and a material for the polymer adhesive layer are sequentially deposited on the second substrate 101 (in FIG. 2) to form the black matrix layer and the polymer adhesive layer. The black matrix layer and the polymer adhesive layer are synchronously or heterochronously patterned through a photo-etching process, thereby forming the black matrix layer 111 (in FIG. 2), under which the polymer adhesive layer 190 (in FIG. 2) is formed.

The black matrix layer and the polymer adhesive layer may be heterochronously patterned by wet-etching the black matrix layer and dry-etching the polymer adhesive layer. Alternately, both the black matrix layer and the polymer adhesive layer may be dry-etched. When the black matrix layer and the polymer adhesive layer are dry-etched, the black matrix layer and the polymer adhesive layer may be synchronously dry-etched in one chamber. When the black matrix layer and the polymer adhesive layer are synchronously dry-etched in one dry-etching chamber different etching gases are used because the black matrix layer and the polymer adhesive layer are made of different materials. The black matrix layer may be made of an organic substance including chrome oxide ($CrO_x$), chrome (Cr), or carbon (C).

Second Embodiment

Figure 4:
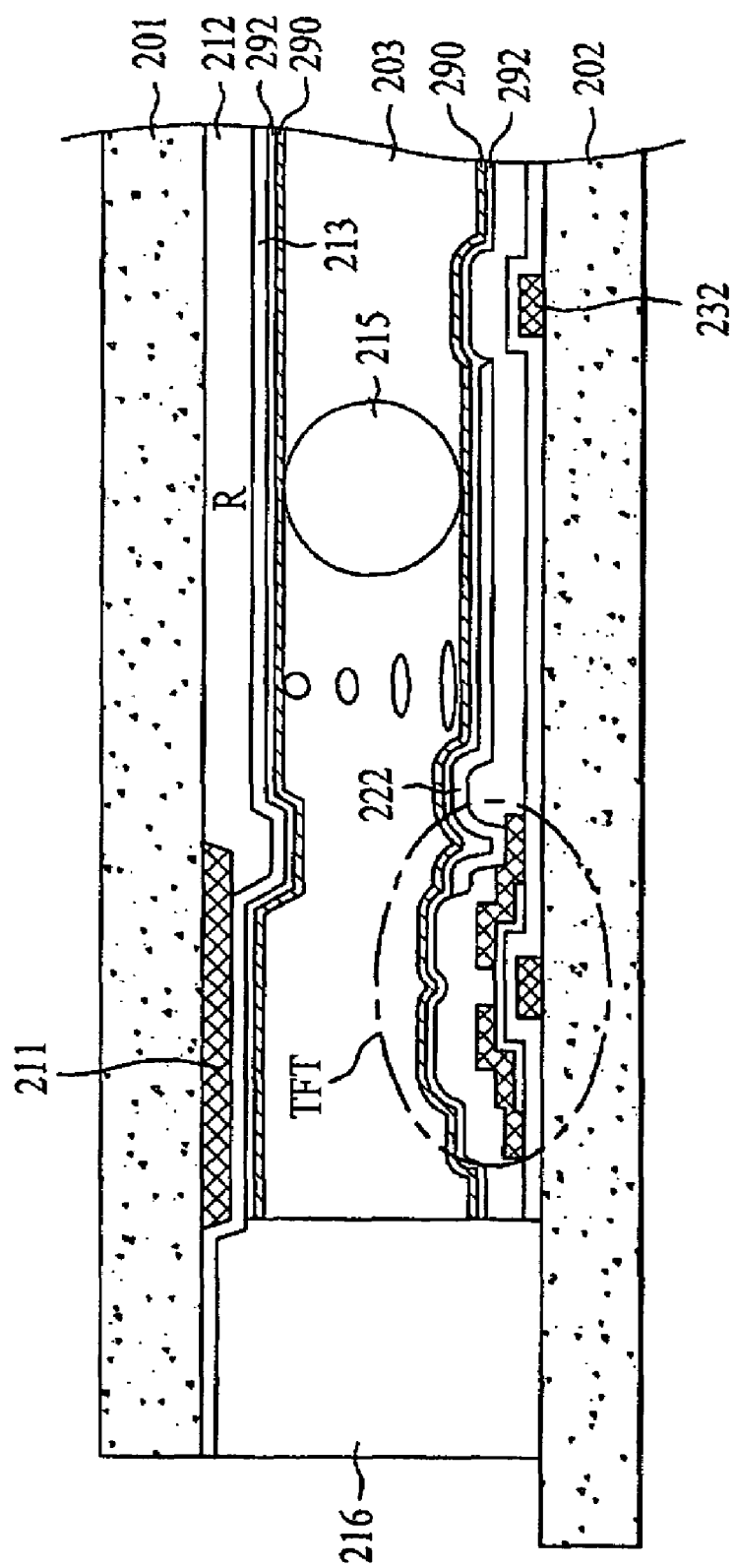
FIG. 4 is a sectional view of a liquid crystal display device in accordance with a second embodiment of the present invention.

FIG. 4 is a sectional view of a liquid crystal display device in accordance with a second embodiment of the present invention, and FIGS. 5A to 5D are sectional views illustrating a method for manufacturing the liquid crystal display device in accordance with the second embodiment of the present invention.

As shown in FIG. 4, the liquid crystal display device of the second embodiment includes first and second substrates 202 and 201 opposing each other, a sealant 216 that bonds the first and second substrates 202 and 201 to each other deposited along the edge of the first substrate 202 except for a liquid crystal inlet, spacers 215 that maintain a cell gap between the first and second substrates 202 and 201 and a cell gap at the liquid crystal inlet, and a liquid crystal layer 203 filling a space between the first and second substrates 202 and 201.

Data lines (not shown) and gate lines 232 that cross each other to define sub-pixels and TFTs formed at the crossings between the data lines and the gate lines 232 that are switched ON/OFF based on the sub-pixels are formed on the inner surface of the first substrate 202. Furthermore, pixel electrodes 222 opposing a common electrode 213 that apply voltages for driving liquid crystal, an orientation film 292 covering the overall surface of the first substrate 202 including the pixel electrodes 222 and a polymer adhesive layer 290 formed on the overall surface of the first substrate 202 including the orientation film 292 that improves adhesive characteristics between the liquid crystal layer 203 and the orientation film 292 are formed on the inner surface of the first substrate 202.

A black matrix layer 211 that prevents light from leaking and red (R), green (G), and blue (B) colors from mixing, an R, G, and B color filter layer 212, a common electrode 213 that applies voltage to liquid crystal with the pixel electrodes 222, an orientation film 292 covering the overall surface of the second substrate 201 including the common electrode 213, and a polymer adhesive layer 290 formed on the overall surface of the second substrate 201 including the orientation film 292 that improves adhesive characteristics between the liquid crystal layer 203 and the orientation film 292 is formed on the inner surface of the second substrate 201.

As described above, the orientation films 292 determine an initial orientation of the liquid crystal layer 203 and are respectively formed on the inner surfaces of the first and second substrates 202 and 201. The thin polymer adhesive layer 290 interposed between the liquid crystal layer 203 and the orientation film 292 serves to increase the anchoring energy of the liquid crystal layer 203.

In order to determine the initial orientation of the liquid crystal layer 203, a rubbing roll may rub the surface of the orientation film 292 or light may be irradiated onto the orientation film 292. Thus, the polymer adhesive layer 290 stabilizes the initial orientation of the liquid crystal layer 203. This is due in part to the liquid crystal being a fluid material.

The polymer adhesive layer 290 may be made of a compound containing styrene, MMA, and BCB in designated quantities and may have an ultra-thin thickness of less than 5 nm.

A process for manufacturing the liquid crystal display device of this embodiment will be described.

Figure 5A:
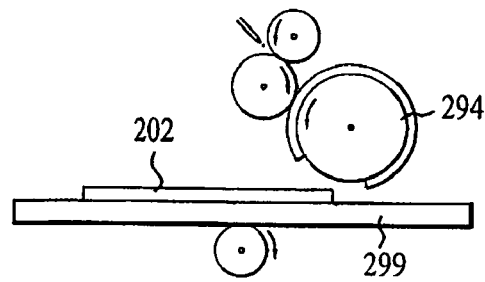
FIGS. 5A, 5B, 5C and 5D are sectional views illustrating a method for manufacturing the liquid crystal display device in accordance with the second embodiment of the present invention.

First, a substrate washing process that removes foreign substances from the first substrate 202 having patterns, such as gate lines, data lines, TFTs, and pixel electrodes, formed thereon is performed. Then, as shown in FIG. 5A, an orientation film printing process that prints an orientation film raw material solution, for example, polyamic acid or soluble polyimide, on the upper surface of the first substrate 202 is performed. During this process, the first substrate 202 moves in one direction by a carrier plate 299 using an orientation film printing apparatus 294.

Figure 5B:
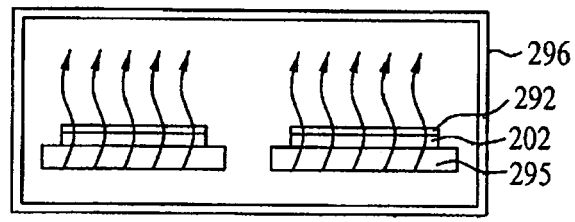

Thereafter, as shown in FIG. 5B, the first substrate 202 having the orientation film 292 formed on the upper surface thereof is placed in a hot chamber 296 and is loaded on a hot plate 295, and heat is applied to the first substrate 202 to harden the orientation film 292. That is, the orientation film raw material solution may first be hardened by heating at a temperature of about 60-80° C., and may then be hardened by heating at a temperature of about 80-200° C.

Figure 5C:
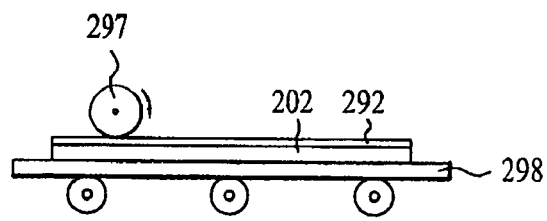

As shown in FIG. 5C, a rubbing process that rubs the surface of the orientation film 292 of the first substrate 202 to form grooves is performed using a cylindrical rubbing roll 297. The first substrate 202 is moved in one direction by the carrier plate 298. Thereby, a pre-tilt angle of the orientation film 292 is formed. Alternatively, instead of performing the rubbing process using the rubbing roll 297, the pre-tilt angle of the orientation film 292 may be formed by light irradiation.

The rubbing roll 297 is rubbed onto the surface of the orientation film 292 at uniform pressure and velocity, and causes polymer chains on the surface of the orientation film 292 to be arranged in a designated direction, thereby causing molecules of the liquid crystal layer 203 contacting the orientation film 292 to be arranged in a designated direction.

Figure 5D:
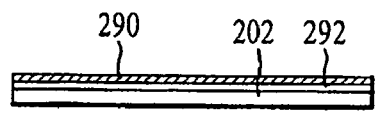

Thereafter, as shown in FIG. 5D, the polymer adhesive layer 290 is formed on the first substrate 202 having the orientation film 292, the upper surface of which has been rubbed. The polymer adhesive layer 290 may be formed using a spin-coating method or a roll-coating method, and is hardened to volatilize a solvent. The polymer adhesive layer 290 may be made of a compound containing styrene, MMA, and BCB in designated quantities and may have an ultra-thin thickness of less than 5 nm.

Further, the orientation film 292 and the polymer adhesive layer 290 thereon are formed on the second substrate, having the black matrix layer, the color filter layer, and the common electrode, by a process that may be the same as or similar to the above process.

Finally, the first substrate 202 having the sealant 216 (in FIG. 4) serving as an adhesive and the second substrate 201 having the spacers 215 are bonded to each other and liquid crystal is injected into a space between the first substrate 202 and the second substrate 201. The liquid crystal inlet is sealed so as to prevent the liquid crystal from leaking, thereby completing a liquid crystal display device in accordance with a second embodiment of the present invention.

Because the polymer adhesive layer is interposed between the liquid crystal layer and the orientation film, the anchoring energy of the liquid crystal layer onto the orientation film is increased. Thus, the orientation of the liquid crystal layer is firmly stabilized.

Further, in order to improve characteristics between an overcoat layer and the sealant, the polymer adhesive layer may be interposed between the overcoat layer and the sealant. In this case, the polymer adhesive layer may be formed on the overcoat layer, at a portion where the sealant is located, by a printing method.

Third Embodiment

Figure 6:
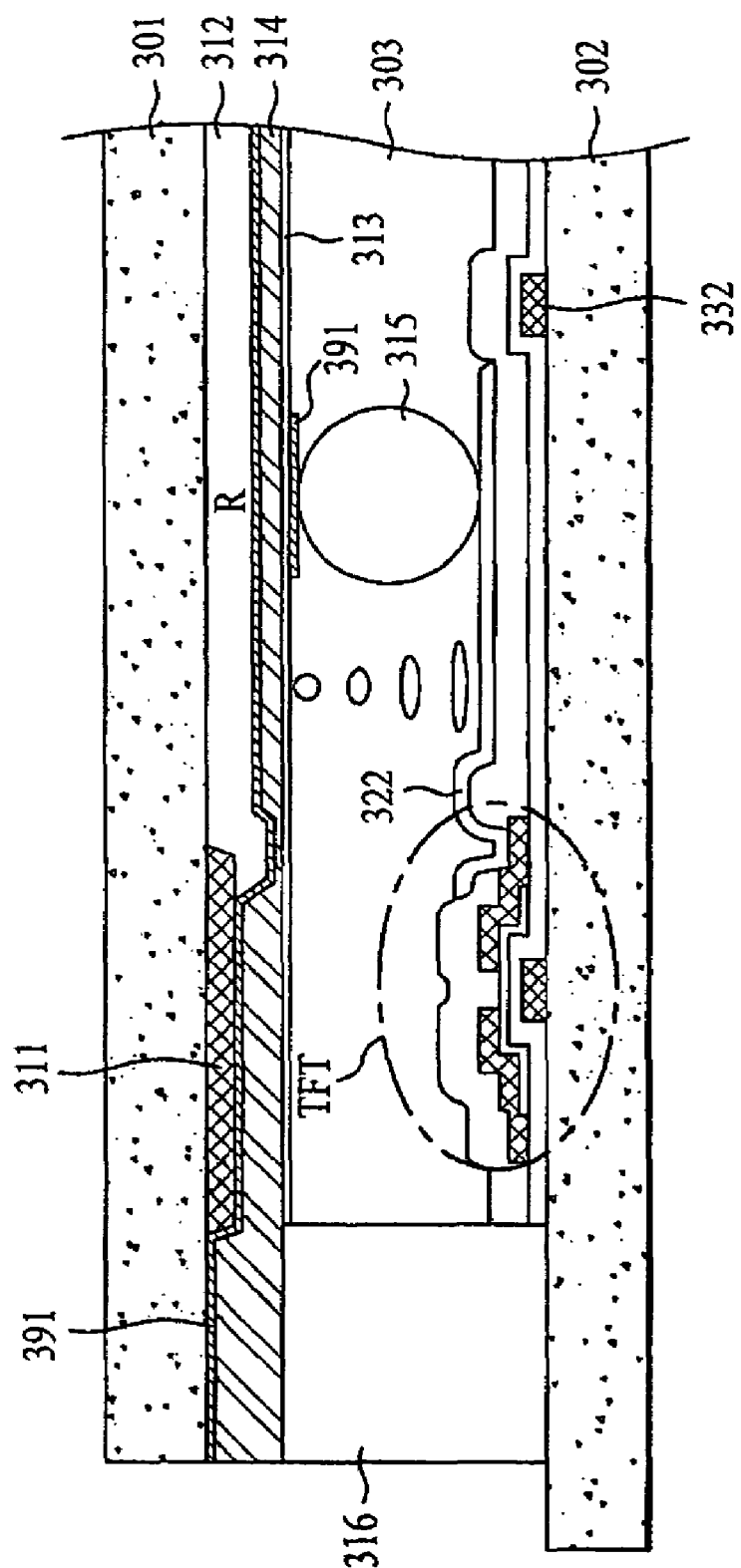
FIG. 6 is a sectional view of a liquid crystal display device in accordance with a third embodiment of the present invention.
Figure 7:
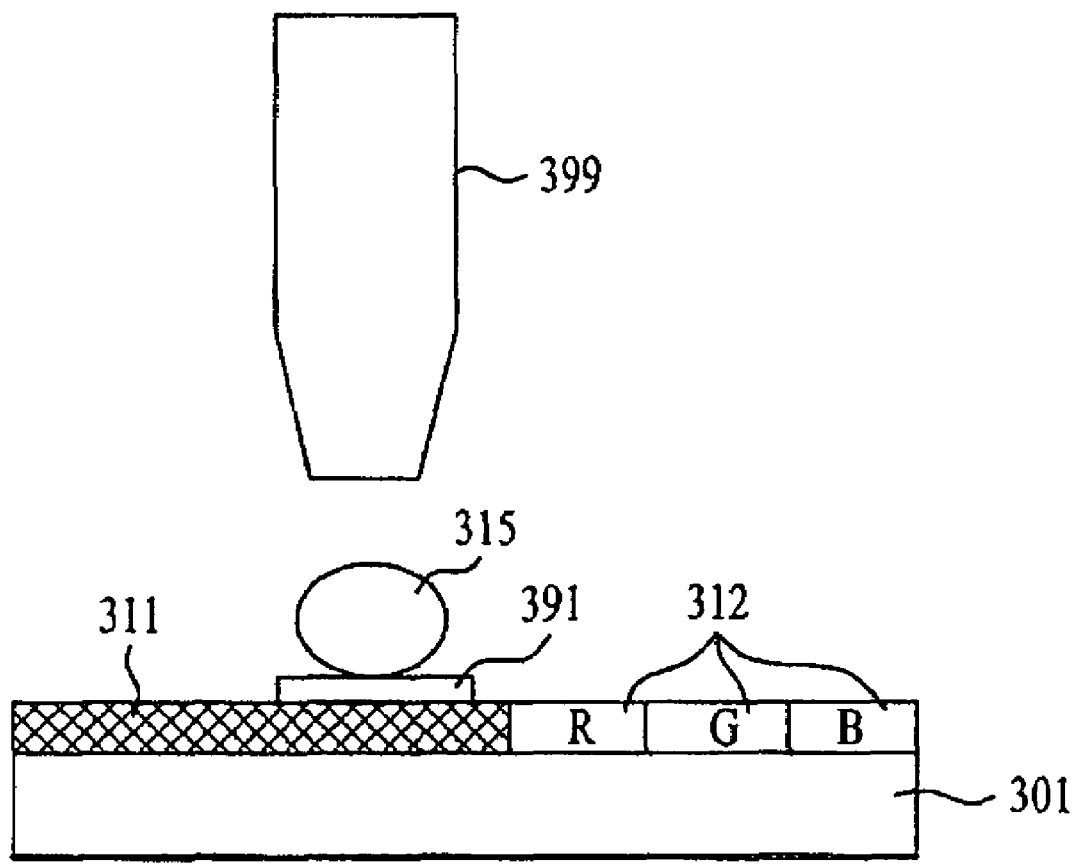
FIG. 7 is a sectional view illustrating a method for manufacturing the liquid crystal display device in accordance with the third embodiment of the present invention.

FIG. 6 is a sectional view of a liquid crystal display device in accordance with a third embodiment of the present invention and FIG. 7 is a sectional view illustrating a method for manufacturing the liquid crystal display device in accordance with the third embodiment of the present invention.

As shown in FIG. 6, the liquid crystal display device of the third embodiment includes first and second substrates 302 and 301 opposing each other, a sealant 316 that bonds the first and second substrates 302 and 301 to each other deposited along the edge of the first substrate 302 except for a liquid crystal inlet, spacers 315 that maintain a cell gap between the first and second substrates 302 and 301 and a cell gap at the liquid crystal inlet, a polymer adhesive layer 391 interposed between the spacers 315 and a pattern of the second substrate 301, and a liquid crystal layer 303 filling a space between the first and second substrates 302 and 301.

Because the spacers 315 are fixed by the polymer adhesive layer 391, it is possible to prevent the movement of the spacers 315. The spacers 315 may be ball spacers or column spacers.

Data lines (not shown) and gate lines 332 that cross each other to define sub-pixels and TFTs formed at the crossings between the data lines and the gate lines 332 that are switched ON/OFF based on the sub-pixels are formed on the inner surface of the first substrate 202. Furthermore, pixel electrodes 322 opposing a common electrode 313 that apply voltages for driving liquid crystal are formed on the inner surface of the first substrate 302.

A black matrix layer 311 that prevents light from leaking and red (R), green (G), and blue (B) colors from mixing, an R, G, and B color filter layer 312, an overcoat layer 314 formed on the overall surface of the second substrate 301 including the color filter layer 312 that compensates for the differences in heights of the color filter layer 314 and planarizes the surface of the second substrate 301, a polymer adhesive layer 391 interposed between the color filter layer 312 and the overcoat layer 314, and a common electrode 313 that applies voltage to liquid crystal together with the pixel electrodes 322 are formed on the inner surface of the second substrate 301.

The overcoat layer 314 may be formed by coating an organic matter, i.e., an acrylic resin. When a sealant is formed on the overcoat layer at the edge of a substrate, the overcoat layer is separated from the edge of the substrate because organic matter has poor adhesion to the substrate. Accordingly, the overcoat layer is removed from a portion of the substrate, at which the sealant will be formed, and the sealant directly contacts the substrate. In order to remove the overcoat layer, a photo-etching process may be performed, thus complicating the method for manufacturing the liquid crystal display device. Accordingly, the polymer adhesive layer 391 is interposed between the overcoat layer 314 and the second substrate 301, thereby improving adhesive characteristics between the overcoat layer 314 and the second substrate 301.

As described above, the polymer adhesive layer 391 is formed between the second substrate 301 and the overcoat layer 314, thereby preventing the overcoat layer 314 from peeling off from the second substrate 301.

Further, the polymer adhesive layer 391 is interposed between the overcoat layer 314 at the edge of the second substrate 301 and the sealant 316, thus improving adhesive characteristics between the overcoat layer 314 and the sealant 316.

The polymer adhesive layer 391 may be made of a compound containing styrene, MMA, and BCB in designated quantities and may have an ultra-thin thickness of less than 5 nm.

A process for manufacturing the liquid crystal display device of this embodiment will be described with reference to FIGS. 6 and 7.

First, the second substrate 301 provided with the black matrix layer 311 and the R, G, and B color filter layer 312 is washed so that dust and foreign substances are removed from the second substrate 301. Then, in order to improve adhesive characteristics between the second substrate and the overcoat layer, the polymer adhesive layer 391 is formed on the overall surface of the second substrate 301 including the color filter layer 312. The polymer adhesive layer 391 is coated using a spin-coating method or a roll-coating method and is hardened to volatilize a solvent. The polymer adhesive layer 391 may be made of a compound containing styrene, MMA, and BCB in designated quantities and may have an ultra-thin thickness of less than 5 nm.

Thereafter, the overcoat layer 314 is formed by coating the overall surface of the second substrate 301 including the polymer adhesive layer 391 with an organic matter, i.e., an acrylic resin, and hardening the acrylic resin by irradiating UV rays onto the acrylic resin. Thereby, the overcoat layer 314 at the edge of the second substrate 301 does not directly contact the second substrate 301 and contacts the polymer adhesive layer 391. Thus, the overcoat layer 314 is prevented from peeling off from the second substrate 301.

Then, the common electrode 313 is formed by depositing a transparent conductive material, such as Indium Tin Oxide (ITO) or Indium Zinc Oxide (IZO), on the overall surface of the second substrate 301 including the overcoat layer 314.

Thereafter, the polymer adhesive layer 391 is selectively formed on spacer regions. In order to selectively form the polymer adhesive layer 391, a printing method, such as an ink-jet printing method, is used. A spin-coating method is not used. The polymer adhesive layer 391 may be made of a compound containing styrene, MMA, and BCB in designated quantities and may have an ultra-thin thickness of less than 5 nm.

Thereafter, the spacers 315 are formed on the polymer adhesive layer 391 using a nozzle 399 filled with ball spacers, such as plastic balls or silica balls. Accordingly, because the spacers 315 are fixed to the polymer adhesive layer 391, it is possible to prevent the movement of the spacers 315. The polymer adhesive layer 391 may be interposed between the spacers 315 and the second substrate 301 and/or between the spacers 315 and the first substrate 302 (with reference to FIG. 6).

Instead of ball spacers, column spacers may be applied to the present invention. Column spacers may be formed by depositing an organic matter on the overall surface of a substrate and patterning the organic matter by a photo-etching process. The polymer adhesive layer may be formed between the column spacers and the substrate. The polymer adhesive layer, the organic matter, and a photoresist are sequentially deposited on the substrate. The photoresist is patterned and the organic matter and the polymer adhesive layer are sequentially etched using the patterned photoresist as a mask. Then, the remaining photoresist is removed. Finally, a sealant is deposited along the edge of a first substrate, on which gate lines, data lines, TFTs, and pixel electrodes are formed, except for a liquid crystal inlet, and the first substrate and the second substrate, on which the spacers are printed, are bonded. Then, the inside of a liquid crystal cell is vacuumed, liquid crystal is injected into a space between the two substrates through the liquid crystal inlet using a capillary, and the liquid crystal inlet is sealed, thereby completing a liquid crystal display device in accordance with the present invention.

As apparent from the above description, the present invention provides a liquid crystal display device and a method for manufacturing the same, which have several effects, as follows.

First, a polymer adhesive layer may be interposed between a substrate and a pattern and/or between one pattern and another pattern. That is, the polymer adhesive layer is interposed where peeling problems occur and thereby improves adhesive characteristics between these elements and prevents one element from peeling off from another element. The polymer adhesive layer may be made of a compound containing styrene, MMA, and BCB in designated quantities and may have an ultra-thin thickness of less than 5 nm.

Accordingly, it is possible to reduce the generation of process errors and improve the reliability of the device.

Second, because the polymer adhesive layer is interposed between a substrate and gate lines, it is possible to prevent the gate lines from peeling off from the substrate.

Accordingly, because it is not necessary to form a metal barrier layer, for preventing the gate lines from peeling off from the substrate, under a gate line layer, a process for manufacturing the liquid crystal display device becomes simple. That is, instead of the metal barrier layer being formed by a sputtering method, the polymer adhesive layer is formed by a coating method. This simplifies the process for manufacturing the liquid crystal display device.

Third, because the polymer adhesive layer is interposed between a liquid crystal layer and an orientation film, an anchoring energy of the liquid crystal layer onto the orientation film is increased, thus stabilizing the orientation of the liquid crystal layer.

Fourth, because the polymer adhesive layer is formed at portions, where spacers will be formed, the locations of the spacers are fixed, thus preventing the spacers from moving in a liquid crystal cell.

Although the exemplary embodiments of the present invention illustrate a TN mode liquid crystal display device, in which a lower substrate having pixel electrodes and an upper substrate having a common electrode are bonded to each other so that a liquid crystal layer is driven by a vertical electric field formed between the pixel electrodes and the common electrode, the present invention may be equally applied to an IPS mode liquid crystal display device. In the IPS mode liquid crystal display device, pixel electrodes and a common electrode are formed in parallel on one substrate and a liquid crystal layer is driven by a horizontal electric field formed between the pixel electrodes and the common electrode. Accordingly, the IPS mode liquid crystal display device has an excellent viewing angle compared to the viewing angle of a TN mode liquid crystal display device.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
    a first substrate including gate lines, data lines, TFTs, and pixel electrodes on an inner surface of the first substrate;
    a second substrate bonded to the first substrate and including a black matrix layer and a color filter layer on an inner surface of the second substrate;
    a liquid crystal layer between the first and second substrates;
    orientation films between the liquid crystal layer and the first substrate and between the liquid crystal layer and the second substrate;
    a sealant along an edge of at least one of the first and second substrates that bonds the first and second substrates to each other;
    spacers that maintain a cell gap between the first and second substrates; and
    a polymer adhesive layer interposing in at least one of portions, between the first substrate and the gate lines including gate electrodes of the TFTs, between the second substrate and the black matrix layer, between the first or second substrates and the sealant, between the liquid crystal layer and the orientation films, and between the first or second substrates and the spacers wherein the polymer adhesive layer improves adhesive characteristics.

2. The liquid crystal display device as set forth in claim 1, wherein the polymer adhesive layer is made of a compound containing styrene, MMA, and BCB, and has a thickness of less than 5 nm.

3. The liquid crystal display device as set forth in claim 1, further including an overcoat layer covering the black matrix layer and the color filter layer on the second substrate.

4. The liquid crystal display device as set forth in claim 3, further including a polymer adhesive layer interposing in at least one of portions between the color filter layer and the overcoat layer, between the black matrix layer and the overcoat layer, between the second substrate and the overcoat layer, and the overcoat layer and the sealant.

5. The liquid crystal display device as set forth in claim 1, further including a common electrode on an overall surface of the second substrate.

6. A method for manufacturing a liquid crystal display device comprising:
    preparing a first substrate including gate lines, data lines, TFTs, and pixel electrodes on an inner surface of the first substrate;
    preparing a second substrate including a black matrix layer and a color filter layer on an inner surface of the second substrate
    forming orientation films on the first and second substrates, respectively;
    forming a sealant along an edge of at least one of the first and second substrates;
    forming spacers on the first or second substrate;
    bonding the first and second substrates to each other;
    forming a liquid crystal layer between the first and second substrates; and
    interposing a polymer adhesive layer in at least one of portions between the first substrate and the gate lines including gate electrodes of the TFTs, between the second substrate and the black matrix layer, between the first or second patterns and the sealant, between the liquid crystal layer and the orientation films, and between the first or second substrates and the spacers, wherein the polymer adhesive layer improves adhesive characteristics.

7. The method as set forth in claim 6, wherein the polymer adhesive layer is made of a compound containing styrene, MMA, and BCB, and has a thickness of less than 5 nm.

8. The method as set forth in claim 6, wherein the polymer adhesive layer is formed on an overall surface of at least one of the first and second substrates using a coating method.

9. The method as set forth in claim 6, wherein the polymer adhesive layer is selectively formed on designated portions of at least one of the first and second substrates using a printing method.

10. The method as set forth in claim 6, wherein interposing the polymer adhesive layer between the first substrate and the gate lines includes:
    forming the polymer adhesive layer and a metal layer on the first substrate;
    applying a photoresist on the metal layer;
    patterning the photoresist;
    etching the metal layer using the patterned photoresist as a mask;
    etching the polymer adhesive layer using the patterned photoresist as a mask; and
    removing the photoresist.

11. The method as set forth in claim 10, wherein the metal layer is wet-etched and the polymer adhesive layer is dry-etched.

12. The method as set forth in claim 10, wherein the metal layer and the polymer adhesive layer are dry-etched.

13. The method as set forth in claim 12, wherein the metal layer and the polymer adhesive layer are simultaneously dry-etched in one chamber.

14. The method as set forth in claim 10, wherein the polymer adhesive layer is etched using $O_2$ plasma.

15. The method as set forth in claim 6, wherein interposing the polymer adhesive layer between the second substrate and the black matrix layer includes:
    forming the polymer adhesive layer and depositing a black matrix material on the second substrate;
    forming a photoresist on the black matrix material;
    patterning the photoresist;
    etching the black matrix material using the patterned photoresist as a mask, thereby forming the black matrix layer;
    etching the polymer adhesive layer using the patterned photoresist as a mask; and removing the photoresist.

16. The method as set forth in claim 15, wherein the black matrix material is wet-etched and the polymer adhesive layer is dry-etched.

17. The method as set forth in claim 15, wherein the black matrix material and the polymer adhesive layer are dry-etched.

18. The method as set forth in claim 6, further comprising forming an overcoat layer covering the color filter layer and the black matrix layer on the second substrate as the first and second patterns.

19. The method as set forth in claim 18, further comprising a polymer adhesive layer is formed on an overall surface of the second substrate including the color filter layer and the black matrix before forming the overcoat layer.

20. The method as set forth in claim 6, wherein the polymer adhesive layer is selectively formed on an edge of at least one of the first and second substrates, along which the sealant is formed, before forming the sealant.

21. The method as set forth in claim 6, wherein the polymer adhesive layer is formed at portions where the spacers are formed before forming the spacers on the overall surface of at least one of the first and second substrates.

22. The method as set forth in claim 21, wherein the spacers are formed by an ink-jet printing method.

23. The method as set forth in claim 22, wherein forming the polymer adhesive layer at portions where the spacers are formed, includes:
   selectively forming the polymer adhesive layer on at least one of the first and second substrates; and
   forming the spacers on the polymer adhesive layer using a nozzle.

24. The method as set forth in claim 21, wherein the spacers are patterned by a photo-etching process.

25. The method as set forth in claim 24, wherein forming the polymer adhesive layer where the spacers are formed, includes:
   sequentially depositing the polymer adhesive layer, an organic matter, and a photoresist on at least one of the first and second substrates;
   patterning the photoresist;
   etching the organic matter and the polymer adhesive layer using the patterned photoresist as a mask; and removing the photoresist.

26. The method as set forth in claim 6, further comprising forming an common electrode on an overall surface of the second substrate.

* * * * *